March 11, 1941. R. T. HOLMES 2,234,841
MACHINE FOR SLITTING ROLLS
Filed May 24, 1939 6 Sheets-Sheet 2

Inventor
Raymor T. Holmes
By Clayton L. Jenks
Attorney

Patented Mar. 11, 1941

2,234,841

UNITED STATES PATENT OFFICE 2,234,841

MACHINE FOR SLITTING ROLLS

Raymon T. Holmes, Worcester, Mass., assignor to Worcester Baking Company, Worcester, Mass., a corporation of Massachusetts Application May 24, 1939, Serial No. 275,422

15 Claims. (Cl. 146—98)

This invention relates to a machine for slitting rolls, and more particularly to a machine which will slit a strip of rolls or other bread products in such a manner that the rolls will still cling together but may be readily broken apart and a frankfurter or other filling inserted within each individual roll.

Rolls adapted for use with frankfurters are ordinarily baked in strips containing 12 rolls; and, when used, the rolls are successively broken off from the strip and then slit open by a knife for insertion of the frankfurter, after which the filled roll is toasted or otherwise treated. This operation presents many objectionable features, including the inconvenience and waste of time involved in manually slitting each roll, as well as the danger of the operator cutting himself. Hence, it is desirable to have these rolls already slit for insertion of the filling when sold on the market. To this end, the several rolls should be cut almost apart while the individual rolls should be cut only sufficiently to permit insertion of the filling, and the rolls should remain in assembled positions to avoid detrimental exposure of the interior to drying conditions. Various types of machines have been used or proposed for slicing loaves of bread, but they are not adaptable for the purpose of slitting the standard strip of rolls; hence it has been necessary heretofore to slit the rolls individually or serially by manual or mechanical operations.

In accordance with my experimentation, I have found that a strip of rolls as customarily made may be suitably slit by means of rotating cutter disks and that the rolls may be left in such condition that two halves of the strip may be assembled back to back and then wrapped automatically in a standard bread loaf wrapping machine. The gang of rotating cutter disks are so spaced and arranged as to slit the individual rolls nearly apart while cutting only part way into the center of each individual roll so that the two halves are firmly hinged together and will not break apart during subsequent handling. Such a machine, however, presents a further problem, in that the friction of the sides of the cutter disks on the soft substance of the pastry is so great that, without some restraining force being applied, the gang of cutter disks will first start to cut into the rolls and then as the frictional adhesion to the rolls increases, the rolls will be moved forward at such a high speed that the knives are likely to crush down the top soft surfaces of the rolls or partly cut the same and finally hurl the rolls from the machine at a high velocity. Also, the frictional grip of the knives on the rolls may twist the roll strip sideways and thus cut it on a diagonal and spoil the material, even though guides are employed at the side to position the roll strip. These and similar problems have made it impossible heretofore to slit all of the rolls in a strip in one operation, and it has been necessary to slit them one at a time.

The primary objects of this invention are accordingly to provide a machine which will serve to slit a plurality of these rolls in a strip and produce a product which is entirely satisfactory for subsequent use without requiring any other cutting operations.

A further object is to provide a machine of this type in which a strip of bread rolls is cut by a gang of rotating cutter knives and the rolls are held properly in position during the cutting operation.

A further object is to provide such a machine having a plurality of cutter disks with mechanism which restrains the movement of the strip of rolls while passing the cutters and causes each roll to be slit properly.

A further object is to provide a mechanism for slitting the rolls and cutting off the outer crusts of each of the two end rolls and removing the same from the strip of rolls so that each of the rolls in the strip including the end ones will be of the same general appearance.

A further object is to provide mechanism for feeding the rolls to the cutting disks in a timed relation with the operation of the cutting and restraining mechanisms. Other objects will be apparent in the following disclosure.

In accordance with this invention, I have provided a mechanism for slitting strips of rolls or other bread products which comprises one or more cutter disks arranged to cut the rolls, together with mechanism which yieldingly restrains the movement of the rolls against the propelling frictional force of the cutter disks and thus causes the rolls to move at a proper cutting rate. This restraining mechanism preferably comprises a guide located in advance of the rolls which serves to hold the rolls in proper position for the cutting operation. One suitable mechanism comprises a guide controlled by a friction device which regulates the rate of movement of the rolls. The mechanism is so arranged that a guide is presented in position for controlling the movement of each strip of rolls as the latter reaches the cutting disks. Also, the machine may be so constructed that the various operations are accomplished substantially automatically, and to that end it may include a feeding device which serves to feed the rolls to the cutter disks at a desired rate or in timed relationship with the operation of other parts of the machine. Various other features may be employed, as described herein.

A machine embodying all of these features is illustrated in the accompanying drawings, in which.

Figure 2:
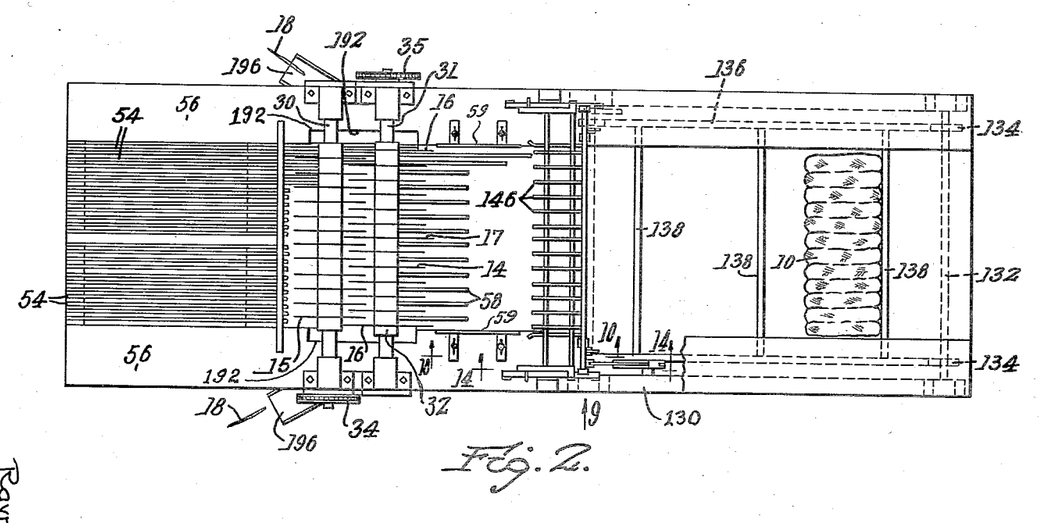
Fig. 2 is a top plan view.
Figure 3:
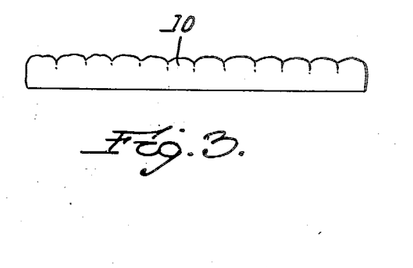
Fig. 3 is a side view of a strip of rolls.
Figure 4:
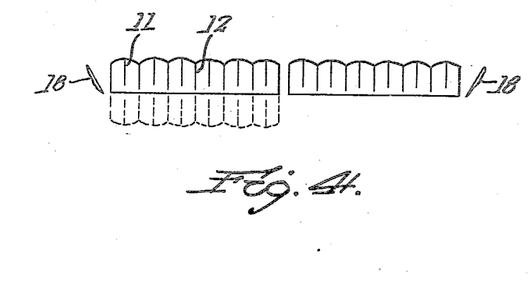
Fig. 4 shows diagrammatically how such a strip is slit, cut apart and rearranged for wrapping.

This machine is especially adapted for slitting a plurality of rolls which are attached laterally and baked in a continuous strip as indicated in Fig. 3. The slitting machine is so constructed and arranged that it provides shallow cuts 11 (Fig. 4) in the center portions of the individual rolls for insertion of the filler therein without breaking the roll apart, and it provides deep cuts 12 which nearly separate the individual rolls but leave them hinged together by a narrow strip of pastry so that the rolls will remain in their initial positions until forcibly broken apart. The cutter knives comprise one or more banks of thin rotating disks sharpened at their peripheries and preferably so mounted as to propel or aid in propelling the strip of pastry through the cutting zone. The knives 14 (Fig. 2) are of larger diameter than the knives 15, so that the former serve to provide the deep slits 12 while the latter provide the shallow slits 11. The two end knives 16 and a centrally located knife 17 are of still larger diameter so as to cut off the outer crusts 18 and to separate the long strip into two halves, as indicated in Fig. 4.

The cutter knives are so rotated by power mechanism that their cutting edges travel in the direction of movement of the rolls during the cutting operation; and the friction between the knives and the rolls preferably constitutes the sole force which carries the rolls through the cutting zone. Since these knives rotate at high speed and the frictional force is very great, the knives tend both to crush the top surfaces of the rolls without cutting them properly and to hurl the rolls from the machine at a high velocity. One primary feature of this invention involves providing a restraining force which permits the rotating knives to move or help move the rolls in their direction of travel but only at a controlled velocity. This restraining force is imposed by means of a control mechanism comprising a guide, such as a set of fingers 20, shown in their several operative positions in Figs. 19, 20 and 21, which are so arranged that when a strip of rolls is fed to the cutting knives these fingers will lie in the path of movement of the strip and will be thrust forward by the frictional force of the cutting operation but only at a controlled rate. While various positively operated control mechanisms may be provided for the purpose, I preferably utilize a device which is freely movable except as it is retarded by a friction brake, such as the long metal bar 22 attached to a flying carriage 23 supporting the fingers 20 and held back by a frictional pressure device so arranged that its resisting force may be adjusted to suit the requirements of the type of cutting operation being performed. Hence, when a strip of rolls 10 is fed to the knives, the latter tend to drag it through the cutting zone with an increasing velocity from the position of Fig. 19 to those of Figs. 20 and 21 as the sides of the cutter disks dig deeper into the rolls; but the fingers 20 on their supporting carriage 23 will move in front of the rolls and act both to guide them and to restrain their movement. This control insures that the cuts are properly made and that the strip is not materially compressed, deformed or otherwise detrimentally affected. In view of this brief statement of a primary feature of this invention, the specific mechanisms of the machine may now be described.

Figure 1:
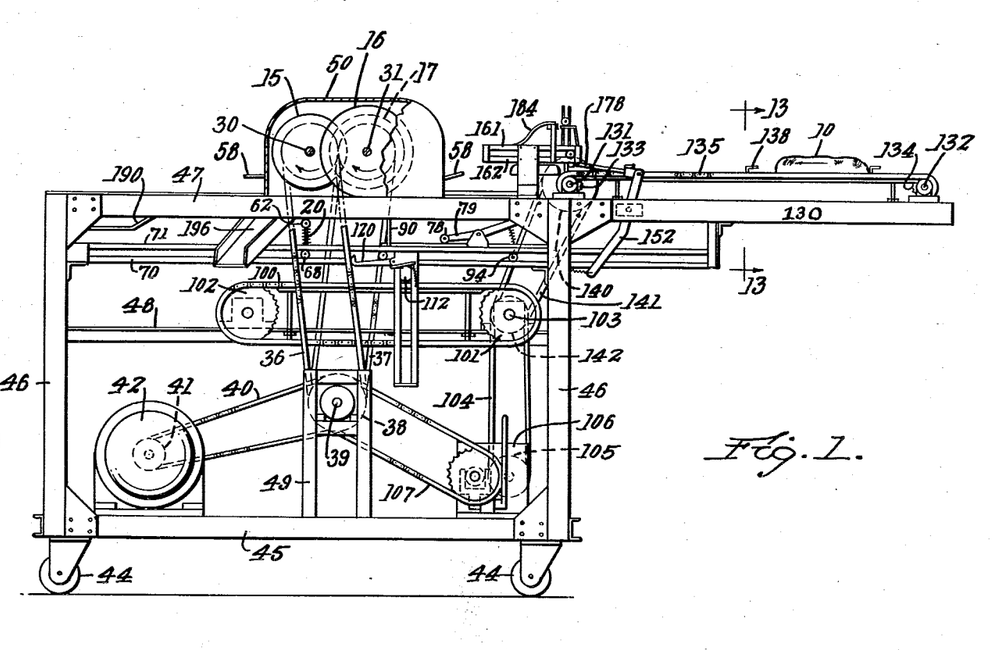
Fig. 1 is a side elevation of the machine.

The cutter knives are preferably arranged in two banks of spaced disks 14, 15, 16 and 17, which are carried on two parallel shafts 30 and 31 mounted in suitable bearings. The disks are properly spaced by collars 32 and they are so mounted and arranged that the rolls are slit to the depths desired, as will be readily understood. These shafts are preferably spaced apart by substantially the width of the strip of rolls so that they may act successively. As shown particularly in Figs. 1 and 2, the shaft 30 carries a sprocket wheel 34 keyed on one end; and these sprocket wheels are driven by the two chains 36 and 37 from suitable sprockets 38 on a shaft 39 mounted on the lower portion of the machine framework. This shaft 39 is driven by a chain 40 and a sprocket 41 on the shaft of an electric motor 42 of standard type, which may be controlled by suitable mechanism.

The framework of the machine may be of any suitable construction and arrangement; but in order that it may be moved into various portions of the bakery, it is preferably mounted on rollers 44. The frame comprises a base 45, upright posts 46, top frame members 47, and intermediate horizontal frame members 48 adapted to carry the various parts of the mechanism. The shaft 39 and associated parts may be suitably mounted on a special supporting frame 49 arranged on the base 45 for the purpose. A housing 50 may be removably mounted over the cutter disks so as to prevent injury to the operator, and this housing will, of course, be suitably cut out at its front and rear to permit passage of the pastry rolls.

A series of spaced bars 54 (Fig. 2) are arranged longitudinally of the machine and at the top thereof but between the cutter disks and beneath their supporting shafts. These constitute a platform or floor along which the strips of rolls are moved. These bars, which are shown broken away in Fig. 2, extend substantially the full distance between vertical end posts 46. Metal plates 56 supplement these bars outside of the longitudinal travel of the rolls and thus aid in forming a table top.

The strip of bread rolls is fed to the knives from the right hand end of the machine (Fig. 1) and the knives are rotated in the direction of the arrows, thus tending to thrust the rolls towards the left. A set of spaced guide rods 58 are arranged longitudinally of the machine above the platform bars 54. These bars 58 pass between the cutter disks and below their supporting shafts and are so located and arranged as to serve as top guides which keep the strip of rolls in position on the platform 54. These bars 58 may be made adjustable in position if desired to accommodate different thicknesses of rolls. Adjustably mounted vertical side plates 59 serve to guide the rolls to the knives.

Figures 6, 7, 8:
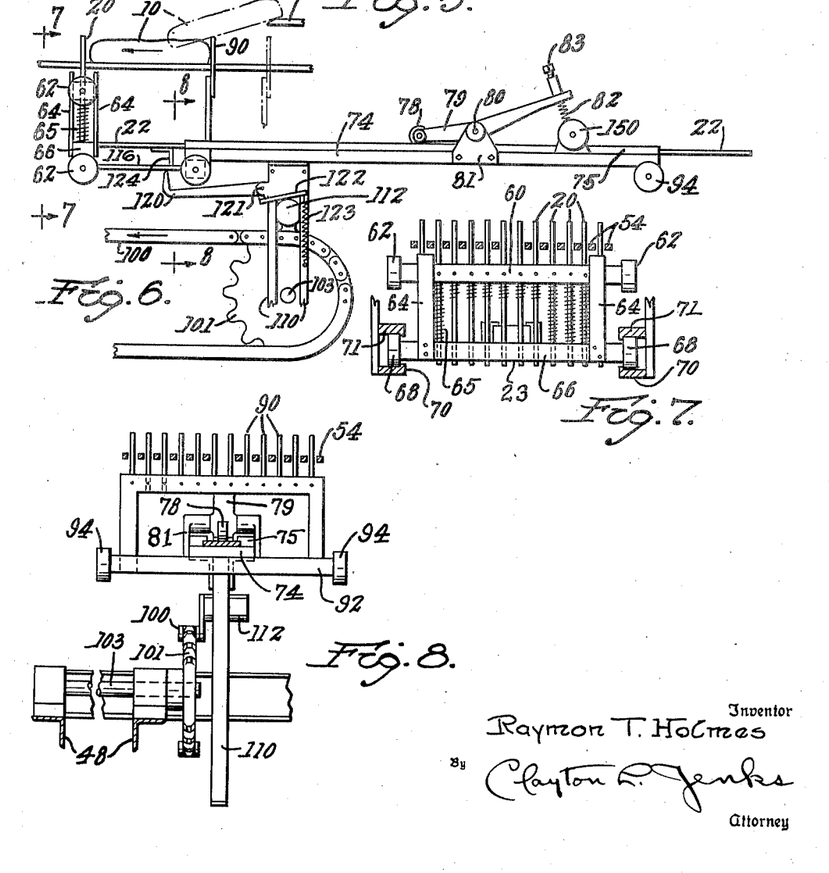
Fig. 6 is a side elevation of the parts shown in Fig. 5.
Fig. 7 is an end view on the line 7—7 of Fig. 6.
Fig. 8 is a similar view on the line 8—8 of Fig. 6.

The retarding fingers 20, which are mounted on the floating carriage 23 and serve to hold back on the roll strip and prevent its going too fast, comprise narrow vertical members projecting upwardly between the spaced platform bars 54 to about the height of a roll, as shown in Figs. 6 and 7, for example. The carriage 23 comprises a cross bar 60 which carries two cam rollers 62 pivotally mounted on its ends. The cross bar 60 is slidably mounted between parallel upright members 64 and is normally held in an uppermost position by springs 65 engaging the bottom bar or axle 66 of the carriage. This axle is in turn mounted on rollers 68, which roll on the horizontal flanged track 70 and beneath a guiding flanged rail 71 supported on the machine frame.

Figure 5:
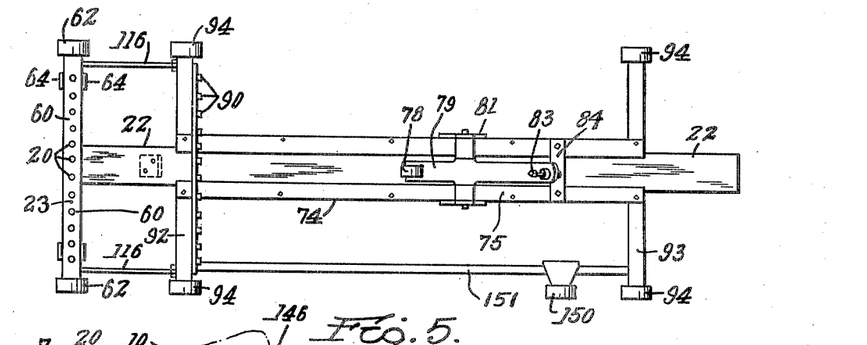
Fig. 5 is a plan view of the strip retarding carriage, looking in the direction of the arrow 5 on Fig. 12.

The floating carriage 23 and its fingers 20 are driven forward by the strip of rolls 10 pressing against the rear of the fingers. This motion is retarded by the friction bar 22 (Figs. 5 and 6) which is suitably secured to the cross bar or axle 66 of the carriage. This bar 22 has an extensive flat surface engagement with the flat top of a horizontal bar 74 extending lengthwise of another carriage which can move only at a controlled rate. Lateral movement of the sliding bar 22 is prevented by the flanges 75 projecting from the bar 74. The frictional drag of the bar 22 on the bar 74 may be varied by means of a device which applies a variable force tending to push the bars more or less tightly together. This may comprise a roller 78 (Fig. 6) pressing down on the top of the bar 22 which is mounted on a swinging lever 79 pivotally supported at 80 on standards 81, which are in turn mounted on the bar 74. A spring 82 is located beneath the right hand end of the swinging lever 79 and a screw 83 serves to adjust the tension of the spring by elongating or compressing the same. The lower end of the spring engages a cross bar 84 on the carriage.

When the strip of rolls 10 is thrust into position at the rear of the fingers 20 and the cutting knives start to slit the same, the fingers 20 will be moved towards the left under the impulse of the cutting operation but at a rate which is controlled by the frictional drag of the bar 22 on the member 74. In the operation of the machine herein described, it is found that this movement of the rolls during the cutting stage is rapid as compared with the normal rate of feeding them to the cutters; but it is nevertheless slow enough so that the rolls are cut properly without being materially deformed.

It will be appreciated that the friction member 74 may be mounted on a fixed portion of the machine, or that other types of friction devices may be utilized to retard the free forward movement of the strip of rolls, and particularly if the bread rolls are to be fed to the cutters manually. A primary feature of such mechanisms lies in providing a retarding force which permits the cutter disks to move the rolls at a rate dependent on the friction therebetween, and wherein the retarding force is yielding and not positive in its action and so does not permit the rolls to be unduly compressed or otherwise detrimentally affected. Hence many types of construction which satisfy this object may be employed.

While a simplified form of machine may be constructed along the lines above described and without a mechanical feeding device, I may provide associated mechanism for feeding the strip of rolls to the cutter disks which guides and starts them properly and insures that the rolls will be cut correctly and not be twisted during the cutting stage. Various types of feeding devices may be employed in cooperation with the cutter disks and the friction retarding mechanism which controls the rate of movement of the rolls through the cutting zone, it being merely desirable that the rolls be presented serially and preferably intermittently so as not to interfere with cutting the rolls traveling ahead. It is also desirable, if the above described reciprocating floating carriage is used to retard the rate of movement of the rolls, that the feeding mechanism operate in timed relation to the movement of the floating carriage so that the latter will be in a starting position when the rolls reach the knives. A preferred mechanism for accomplishing all of these purposes is shown in the drawings and comprises a positively actuated reciprocating mechanism which presents the rolls to the cutters in timed relationship with other operating parts of the machine.

The mechanism illustrated particularly in Figs. 5, 6, 8 and 12 comprises a main carriage which carries the friction bar 74. This carriage has a set of vertically arranged fingers 90 projecting upwardly between the platform ribs 54 and arranged to be located in the rear of a strip of rolls and to propel the same forward. The carriage has a front axle 92 and a rear axle 93. These axles are connected by the bar 74 and thus form a unitary main carriage. The axles have rollers 94 on their ends which also ride on the guide rail 70 and constitute a rolling support for the carriage.

The main carriage is reciprocated by suitable mechanism, and preferably by means of an endless chain. This endless chain 100 (Figs. 1 to 6) is mounted on sprockets 101 and 102 which are in turn suitably supported on cross shafts carried on the side frame members 48. The cross shaft 103 which carries the sprocket 101 has another sprocket keyed thereto and this sprocket is in turn driven by the chain 104 which passes over a sprocket 105, and the latter may be driven through a suitable reduction speed gear mechanism 106 by a chain 107 passing over a positively driven sprocket on the shaft 39.

The main carriage has two parallel depending guide members 110 secured thereon (Figs. 1, 6, 8 and 12). These guide members are spaced apart and arranged to receive a guide roller 112 secured to one of the links of the chain 100. The slot between the guides 110 is of such a size and the parts are so located that the roller 112 projecting laterally from the chain may pass around the two sprockets 101 and 102 and move always within the slot. It will thus be seen that as the chain travels in the direction of the arrow the main carriage will be caused to reciprocate longitudinally of the machine and thus to feed pastry to the knives intermittently.

Figure 19:
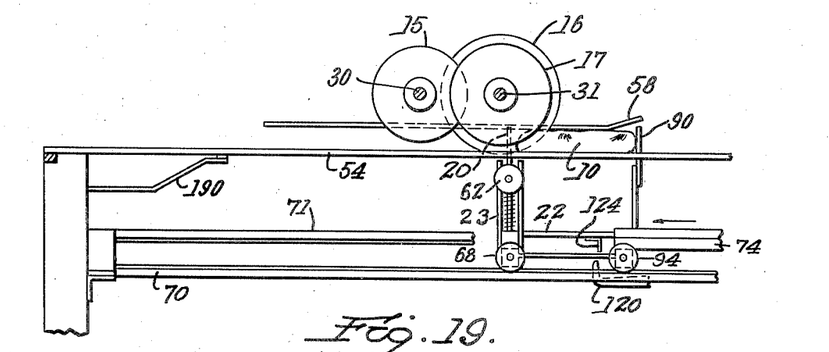
Figs. 19, 20 and 21 are diagrammatic views showing the operation of slicing the rolls.
Figure 20:
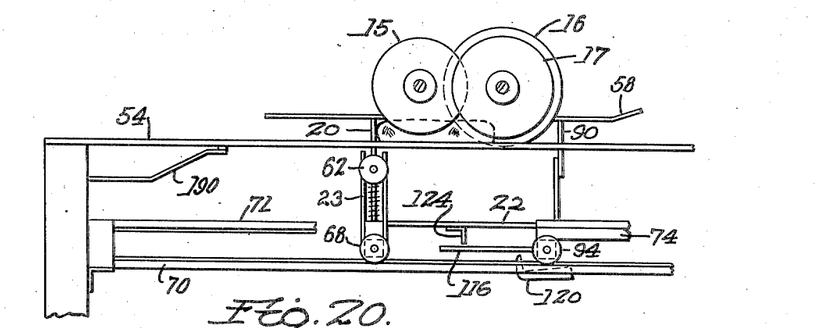
Figure 21:
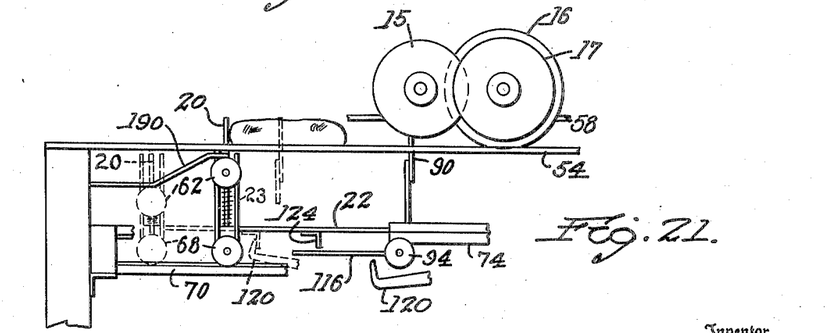

In so far as described, it will be seen that the fingers 90 of the reciprocating main carriage feed a strip of rolls to the cutters, and that the fingers 20 of the floating carriage 23 retards the movement of the strip through the cutting zone. The main carriage travels at a substantially uniform rate towards the left, but when the cutters come into frictional contact with the rolls, they force the floating carriage to move away from the main carriage, as indicated in Figs. 19 to 21. The only connection between the two carriages at that time is made up of the friction bars 22 and 74, but these do not keep the floating carriage from speeding up and moving faster than the positively driven main carriage. When the roll strip has passed the cutters, the floating carriage is no longer subjected to any moving force but must wait until the main carriage overtakes it and pushes it on ahead. This is done by the rods 116 (Figs. 5 and 21), which are carried by the forward axle 92, striking the floating carriage axle 66.

Figure 12:
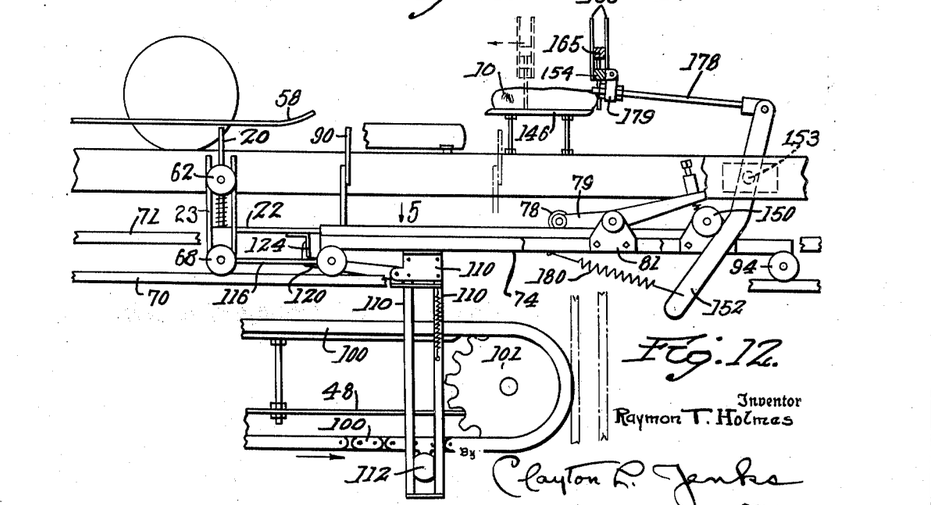
Fig. 12 is a fragmentary side elevation of the machine.

In order to return the floating carriage to its starting position, I provide a latch mechanism, as shown particularly in Figs. 6 and 12, which comprises a latch 120 pivotally mounted at 121 between lugs projecting from the side of the guide members 110. This latch is a lever of the first degree in that it has a rearwardly projecting arm 122. A spring 123 secured to the guide members 110 pulls downwardly on the lever arm 122 and so tends to hold the latch 120 locked against the forward face of an angle iron 124 on the bottom of the friction slide 22 (Fig. 12). This latch 120, therefore, will serve to bring the forward carriage back to its rearmost or initial starting position when the main carriage returns.

In order to permit free forward movement of the floating carriage 23, provision is made for unlocking the latch 120 at that time when the main carriage is started forward in the direction of travel of the strip of rolls. This is accomplished by the driver 112 secured to the sprocket chain 100. That is, as the driver 112 comes up over the sprocket 101 (Fig. 6) and passes into the upper end of the guide slot between the guides 110, it strikes the underside of the lever arm 122 and lifts it against the pressure of the spring 123 and holds it unlocked during the whole period of time that the carriages are moving forward in the direction of travel of the pastry. When the driving pin 112 passes downwardly over the other sprocket 102 it then loses contact with the arm 122 and allows the latch to be thrust upwardly into locking contact with the lug member 124 so that the forward carriage may be pulled back to its starting position. Hence, the floating carriage is connected to the main carriage only when traveling back towards the right.

Although the rolls may be fed by hand to the above described mechanism comprising the pusher fingers 90, it is preferable that the machine be substantially automatic in its operation; and to this end I provide further mechanism which will serve to feed a strip of rolls to the fingers 90 in a timed relationship with the operation of the reciprocating main carriage, so that a strip of rolls may be positioned in advance of the moving fingers 90 at a time when the main carriage has reached its rearmost position and is ready to feed another strip of rolls to the knives. This mechanism, as illustrated, comprises a conveyor on which the loaves of bread or strips of rolls are suitably placed, such as by hand, and which feeds the strips to a table from which they are mechanically pushed into position in advance of the fingers 90 when the main carriage is in position to cause operation of the feeding mechanism.

Figure 13:
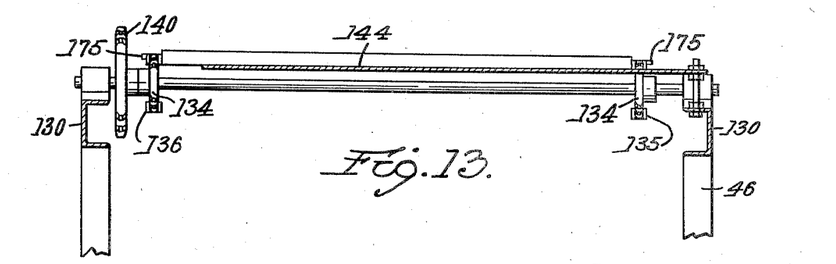
Fig. 13 is a section on the line 13—13 of Fig. 1.
Figure 14:
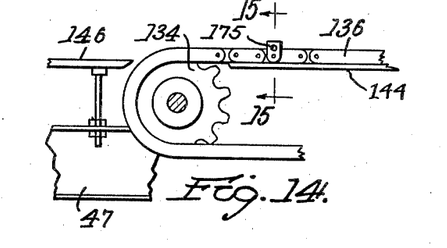
Fig. 14 is a fragmentary sectional view on the line 14—14 of Fig. 2.
Figure 15:
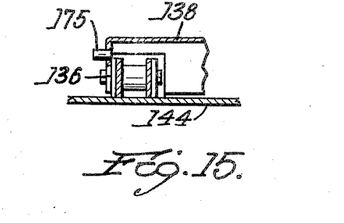
Fig. 15 is a fragmentary section on the line 15—15 of Fig. 14.
Figures 16, 17, 18:
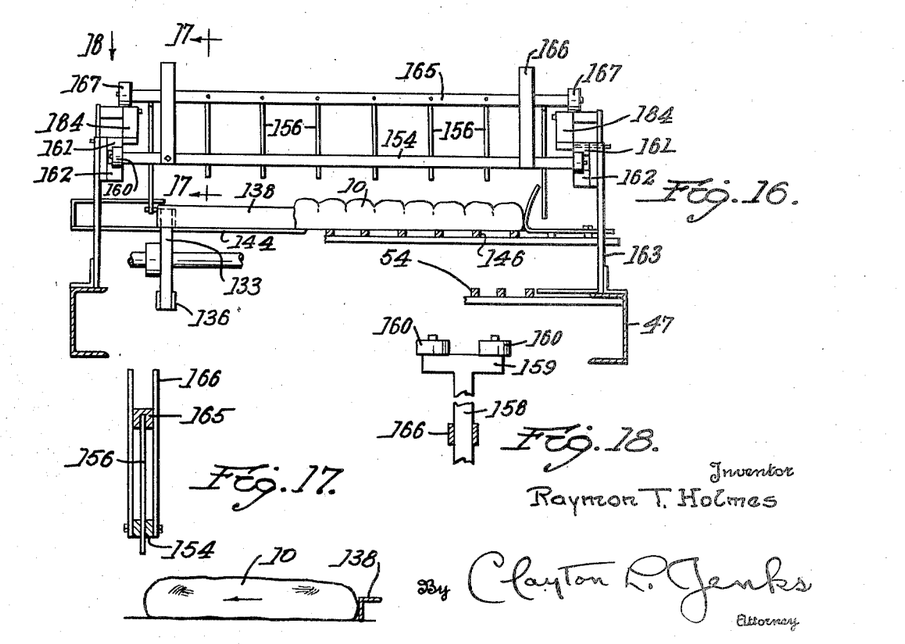
Fig. 16 is a vertical sectional detail of the strip feeding mechanism.
Fig. 17 is an enlarged fragmentary section on the line 17—17 of Fig. 16.
Fig. 18 is a fragmentary plan view looking in the direction of the arrow 18 in Fig. 16.

The two side bars 130 (Figs. 1, 2 and 13) form an extension of the top bars 47 of the frame and are rigidly secured thereto. Mounted on these bars 130 are two parallel shafts 131 and 132 suitably supported in bearings adapted for the purpose. A pair of sprockets 133 on the front shaft and a pair of sprockets 134 on the rear shaft carry endless chains 135 and 136. These two chains are connected together by a series of parallel angle irons or cross bars 138 which are spaced apart by a distance slightly greater than the width of a strip of pastry rolls. The length of these cross bars is also slightly more than the length of a strip of rolls so that the spaces between the bars will each hold one strip. The shaft 131 carries fixed thereto a further sprocket 140 which is driven by a chain 141 (Fig. 1) from another sprocket 142 on the shaft 163, so that this conveyor mechanism is operated in timed relationship with the other parts of the machine.

A plate 144 located just beneath the chains and cross bars 138 and between the shafts 131 and 132 serves as a platform along which the pastry is moved. The plate 144 is preferably arranged at an elevation somewhat higher than are the bars 54 forming the platform under the cutting knives. An extension platform 146 (Fig. 10) supported by rods 147 mounted on the frame has its top face in substantially the same plane with that of the platform 144 so that the endless chain carrier may serve to deposit the strips of rolls serially on the stationary platform 146.

In order to feed the rolls from the platform 146 to the lower table 54 where it may be propelled forward by the upstanding fingers 90 on the main carriage, I provide a special mechanism which is shown particularly in Figs. 9 to 16 inclusive. This transfer of the strip of rolls to the platform bars 54 is preferably accomplished indirectly by the main carriage and its driving mechanism. To this end, a roller 150 (Figs. 5 and 12) is mounted on a rod 151 on the main carriage and arranged to strike the swinging lever 152, which is pivotally mounted at 153 on the extension frame 130. The upper end of this lever is connected to move a carriage, comprising a lower horizontal bar 154 arranged to move fingers 156 mounted to thrust the strip of rolls to the left. The carriage bar 154 (Figs. 16 and 18) has T-heads 159 on its opposite ends carrying a set of rollers 160 which ride between two spaced flanged rails 161 and 162 (Figs. 9 and 16) which are supported on a vertical standard 163 suitably mounted on the frame bar 47. A top horizontal bar 165 (Fig. 10) carries the depending fingers 156, and the latter slide through suitably located holes in the lower bar 154 of the carriage. The bar 165 slides vertically between the spaced parallel guides 166 which are secured to the sides of the lower bar 154. Rollers 167 on the ends of this top bar 165 are adapted to ride on top of the rail 161 (Fig. 9) or a special cam rail 184 provided for the purpose as the carriage is moved back and forth by the depending lever 152 (Fig. 12) and associated parts.

Figures 9, 10, 11:
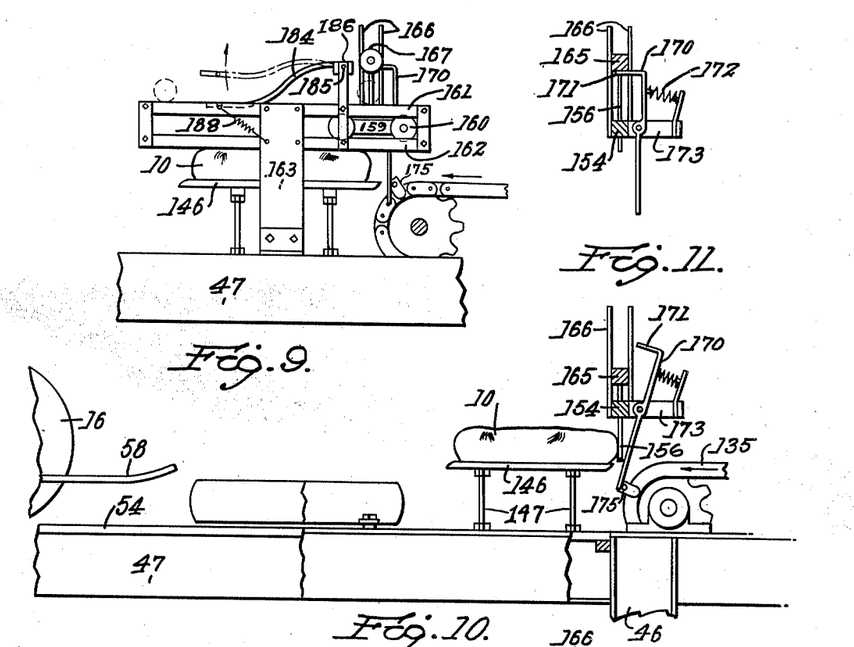
Fig. 9 is a fragmentary enlarged side elevation, looking in the direction of the arrow 9 on Fig. 2.
Fig. 10 is a section on the line 10—10 of Fig. 2.
Fig. 11 is a detail of the trip mechanism shown in Fig. 10.

Since the fingers 156 pass freely through the cross bar 154, these fingers and the top cross bar 165 may move vertically as required. They tend to stay normally in their lowermost positions with the rollers 167 in contact with the rail 161, except as held in an uppermost position by a latch mechanism provided for the purpose. As shown in Figs. 10 and 11, this mechanism comprises a first degree lever 170 supported on the bar 154 which has an inwardly turned horizontal end 171 adapted to project into position beneath the top bar 165. A compression spring 172 supported on the ear 173 which carries the lever 170 tends to hold the latch towards the left (Fig. 11) and thus to keep the fingers in their uppermost position and allow the passage of a strip of rolls therebeneath from the conveyer mechanism to the extension platform 146. Each of the cross bars 138 of the endless chain 135 has a lug 175 (Figs. 13, 14 and 15) fixed at each end in such a position that it will strike the lower end of the swinging lever 170 (Fig. 11) just after the strip of rolls 10 has been thrust onto the raised platform 146. This tips the latch 171 of the lever towards the right and thus releases the horizontal bar 165 and allows the pushers 156 to fall to a position back of the strip of rolls where they may serve at the proper time to thrust the roll strip from the platform into position in front of fingers 90 for feeding to the cutter disks. The strip of rolls 10 remains on the platform 146 until the floating carriage and the main carriage have returned and are in position for feeding another strip of rolls to the cutter knives. As these two lower carriages return towards the right (Fig. 12) the roller 150 on the main carriage strikes the swinging lever 152 and moves its upper end toward the left. This motion is transmitted to the fingers 156 by the connecting rod 178 pivoted to the lever 152 at one end and connected at its other end to a depending link 179 pivotally secured to the carriage cross arm 154. Hence, when the fingers 90 on the main carriage have gotten to the dotted line position of Fig. 12, the fingers 156 will move to the left to propel the strip of rolls 10 from the shelf 146 into position where the fingers 90 on the main carriage may force the rolls against the cutter disks. The propelling fingers 156 on the small carriage are returned toward the right by means of a spring 180 (Fig. 12) connected to the lower end of the lever 152 and a suitable portion of the framework.

When the small carriage which carries the propelling fingers 156 (Figs. 9 and 10) moves toward the left, the top rollers 167 ride on the top rail 161 and lift and pass beneath a pair of swinging cam tracks 184 which are pivoted at 185 to suitable supports 186 mounted on the rails 161 and 162. A spring 188 tends to hold the lower ends of these cam tracks down in the position of Fig. 9. These tracks are so positioned at one side of the cam rail 161 (Fig. 16) that the rollers 167 may ride on the track 161 or the cam rail 184 as required. After the rollers have passed beneath and lifted the cam tracks, then upon returning towards the right they travel up the cam track 184 and thus lift the pushing fingers 156 into their uppermost positions, whereupon the latch 171 will be thrust forward by the spring 172 into the locking position of Fig. 11, where it holds the fingers 156 out of the way and permits another strip of rolls 10 to be moved forward by the endless conveyer 135 onto the platform 146, after which the cycle will be again repeated.

The retarding fingers 20, which yieldingly restrain the forward movement of the strip of rolls during the cutting operation, are preferably removed from a position in advance of the rolls after the cutting operation has been completed, so that the rolls may be moved forward to the left hand end of the platform of the machine. This is accomplished by means of the cam rails 190 shown particularly in Figs. 1 and 19 to 21 inclusive. As there indicated, when the main carriage has caught up with the floating carriage, it pushes the rollers 62 beneath these two parallel rails and causes them to be depressed to the dotted position of Fig. 21 and thus pull the fingers 20 beneath the platform. The fingers 90 propel the rolls to a position where they may be readily removed from the platform. Thereafter the two carriages return to their starting positions.

It is desirable that the two end pieces 18 cut from the strip of rolls, as shown in Fig. 4, be separated from the slitted strip of rolls. To this end, the platform members 56 (Fig. 2) are provided with openings 192 so located that these end pieces 18 may fall therethrough and into the chute 196 through which they travel to a receptacle located at the base of the machine.

The operation of the machine will now be apparent in view of the above disclosure. A strip of rolls is fed by the endless belt 135 to the platform 146 and it remains there until the main carriage fingers 90 are moving into position for receiving the same. The roller 150 on the main carriage then strikes the rocking lever 152 and forces the fingers 156 to the left and thus thrusts the rolls 10 onto the main platform in advance of the fingers 90. This main carriage then proceeds towards the left and pushes the floating carriage on ahead of it until the rolls are in cutting and frictional engagement with the cutting disks. Then the impelling frictional force of these disks forces the rolls and the floating carriage 20, which is not connected at this time to the main carriage, to move forward at an accelerated rate, and the rolls move through the slitting zone at a controlled rate which is determined largely by the speed of the cutter disk and the frictional force generated thereby, but is varied by adjustment of the screw 83 and the frictional drag on the bar 22.

During this forward movement, the fingers 20 serve as guides which are located in advance of the strip of rolls and prevent them from twisting around. The side guide plates 59 (Fig. 2) have previously located the strip of rolls properly for the knives, and the floating fingers 20 hold the rolls in that proper position, so that the rolls are cut with the slits not only in parallel planes but also in parallel alignment with the natural contour of the strip of rolls, as indicated by the creases or depressions between these rolls shown in Figs. 3 and 4. The guiding fingers 20 therefore insure that the strip of rolls cannot be cut at an angle to their contour lines and its end faces. It will, of course, be appreciated that this mechanism may be used for slitting various types and shapes of bread products and that the term "rolls" as used herein is to be interpreted broadly to cover all such products as are adapted for treatment by this machine.

After the rolls have been thrust through the cutting zone under the retarding influence of the fingers 20, and after the fingers have been lowered and the rolls have passed to the left thereof, the two carriages will become locked together and be carried towards the right to their initial starting positions by means of the traveling roller 112 on the endless chain 100. In the meantime, a new strip of rolls 10 has been placed on the elevated platform 146 and the propelling fingers 156 have been dropped to the rear thereof by means of the lugs 175 on the endless chain 135 releasing the latch 171. Then the roller 150 on the main carriage again operates the swinging lever 152 and serves to thrust the rolls 10 into position for being fed to the cutter disks.

It will be appreciated that I may substitute other yielding mechanisms for the friction device employed to control the rate of movement of the rolls through the slitting zone and that these may be so constructed and operated as to permit the rolls to travel either at a controlled rate or at a rate which is determined chiefly by the frictional impelling force of the cutter disks. Such a mechanism preferably comprises a form of retarding device which insures that the rolls travel through the cutting zone at a rate higher than that at which they are fed to the cutter disks. However, this rate of movement of the rolls through the slitting zone may be determined and controlled by mechanism positively operated in timed relation with the feeding mechanism or with the cutter disks.

It will now be apparent that I have provided a machine comprising various mechanisms which may be utilized independently of each other or in cooperation to provide a semi- or a fully automatic machine. Numerous mechanically equivalent constructions may be employed in place of those described above, and many modifications of this machine may be made within the spirit of this invention. The mechanism illustrated in the drawings and above described is only one of the many machines which may be provided for the purpose. Hence, the above description is to be considered as illustrative of the general principles of this invention and of my preferred embodiment thereof and not as limitations thereon, except as defined by the scope of the claims appended hereto.

I claim:

1. A machine for slitting rolls comprising a rotatable cutter disk arranged to slit the rolls and frictionally propel the same, a member movable in the same direction in advance of the rolls and propelled forward at the same rate by the rolls being slit and means for restraining the movement of said member and causing the rolls and member to move during the entire sitting operation at a controlled rate determined by the force imposed thereon by the disk.

2. A machine for slitting rolls comprising a gang of rotating cutter disks arranged to slit the rolls and serve as the sole medium to propel the same, a guide located in advance of and moved by the rolls being slitted at the same rate and in the same direction therewith, means yieldingly retarding movement of the guide and thereby controlling the rate of movement of the rolls under the impelling force imposed by the cutter discs and means for varying the rate of movement of the guide and rolls.

3. A machine for slitting a strip of rolls comprising a set of alternately arranged cutter disks of large and small diameter arranged to cut the rolls nearly apart and to slit the individual rolls to a lesser depth, said disks being so arranged as to provide the sole impelling force tending to move the strip of rolls rapidly in its direction of travel, a guiding member movable in advance of the rolls at the same rate and in the same direction therewith, which is propelled by the strip of rolls during the slitting operation, and means for restraining the movement of said member against the propelling force of the rolls and causing the latter to move at a slower controlled rate, said member serving to guide the rolls and cause the cuts to be straight and in parallel alignment with the natural contour of the strip.

4. A machine for slitting strips of rolls comprising two gangs of positively rotated cutter disks arranged to slit the rolls and propel them in their direction of travel, a roll guiding device movable in the same direction in advance of and propelled solely by the strip of rolls being slitted at the same rate thereof, means which yieldingly restrains the forward travel of the device and associated strips of rolls under the propelling influence of the disks, and means which insures that the yielding device is located in a proper starting position for each slitting operation.

5. A machine for slitting rolls comprising a gang of rotating cutter disks arranged to slit the rolls and serve solely to propel them in their direction of travel, a reciprocable carriage having a guide member located in advance of and moved solely by the rolls during the slitting step and at the same rate and in the same direction therewith, yielding mechanism for controlling the rate of movement of said carriage and restraining the free forward movement of the rolls during the entire cutting operation and means for returning the guide member to a starting position for another slitting operation.

6. A machine for slitting rolls comprising a gang of rotating cutter disks arranged to slit and propel the rolls, a reciprocable carriage, a guide member on the carriage arranged in advance of and moved at the same rate and in the same direction as and solely by the rolls being slitted, means including a friction device for controlling the rate of movement of the guide member and carriage under the propelling influence of the cutter disks and thereby controlling the rate of movement of the rolls past the disks and means for returning the carriage to its starting position.

7. A machine for slitting a strip of rolls comprising a gang of cutter knives mounted to slit the rolls and serve as the sole medium to propel them, means for positively feeding a strip of rolls to the knives at a given rate, a guide located in advance of and contacted by the forward face of the propelled strip of rolls being slitted which is moved by and in the same direction with the strip and at the same rate thereof and means associated therewith which causes the strip to move at a controlled rate in excess of the feeding rate but without being mutilated.

8. A machine for slitting a strip of rolls comprising a set of positively rotated cutter disks arranged to slit and serve as the sole medium to propel the rolls during the slitting operation, a retarding guide located in advance of the rolls and movable solely thereby at the same rate and in the same direction therewith, a yielding device for restraining and controlling the rate of movement of said guide and the associated rolls, means for feeding rolls intermittently to the disks in a position in the rear of said guide and means for positioning the guide at the start of a slitting operation.

9. A machine for slitting rolls comprising a gang of positively rotated cutter disks arranged to cut and propel the rolls, feeding mechanism for intermittently feeding the rolls to the disks at a controlled rate, a device movable with and in advance of the rolls being slitted which is propelled solely by the rolls at the same rate and in the same direction therewith, means for yieldingly retarding the rate of movement of the device and the associated rolls past the cutter disks, and means operated in timed relation with said mechanism which causes said device to be presented in operative position at the start of each slitting operation.

10. A machine for slitting strips of rolls comprising a gang of positively rotated cutter disks arranged to slit and frictionally propel a strip in its direction of travel, positively reciprocated mechanism for intermittently feeding strips of rolls to the cutter disks, means operated in timed relationship therewith for feeding strips of rolls to said mechanism, a guide located in advance of the strip being slitted which is moved thereby at the same rate and in the same direction therewith, and means for yieldingly retarding the movement of said guide and the associated rolls past the cutter disks.

11. A machine for slitting rolls as specified in claim 1 comprising mechanism for intermittently feeding the rolls to the disk and for controlling their rate of movement during the slitting operation and means operated by said mechanism for feeding the rolls intermittently thereto.

12. A machine for slitting rolls as specified in claim 5, comprising means operated by movement of the carriage which serves to feed rolls thereto when the carriage is in position to receive the same.

13. A machine for slitting strips of rolls comprising a gang of cutter knives arranged to slit the rolls and frictionally propel them in their direction of travel, a floating carriage having a guide member arranged in advance of and moved solely by the propelled rolls in the same direction therewith and at the same rate, a yielding device which restrains and controls the forward movement of the carriage under the propelling force of the cutter disks, mechanism for feeding the strips of rolls to the disks and in a position close to the guide member and means for returning the floating carriage to a starting position which operates in timed relationship with the feeding mechanism.

14. A machine for slitting rolls comprising a gang of cutter disks arranged to slit and propel the rolls, a positively moved feeding carriage having a member arranged to move the rolls forward into cutting contact with the disks, a floating carriage in advance of the feeding carriage which has a guide member in front of and moved solely by the propelled rolls at the same rate and in the same direction therewith, means which yieldingly restrains the forward movement of the floating carriage when propelled by the rolls during the slitting operation, and means for returning the carriages to their initial starting positions for another slitting operation.

15. A machine for slitting strips of rolls comprising a gang of cutter disks, a platform adjacent thereto, means for intermittently feeding strips of rolls to said platform, mechanism for intermittently feeding the strips to the disks, means operated in timed relation with the movement of said mechanism for thrusting a strip of rolls from the platorm into position where it may be fed by said mechanism to the cutter disks, a guide moved by the rolls at the same rate and in the same direction therewith and a yielding device which restrains the movement of the guide and causes the associated rolls to move at a controlled rate.

RAYMON T. HOLMES.